Nov. 28, 1967    J. H. LAMBERT    3,354,556
DEVICE FOR CHECKING SEAT LOADING SPRING PRESSURE OF VALVES
IN INTERNAL COMBUSTION ENGINES
Filed June 24, 1965    3 Sheets-Sheet 1
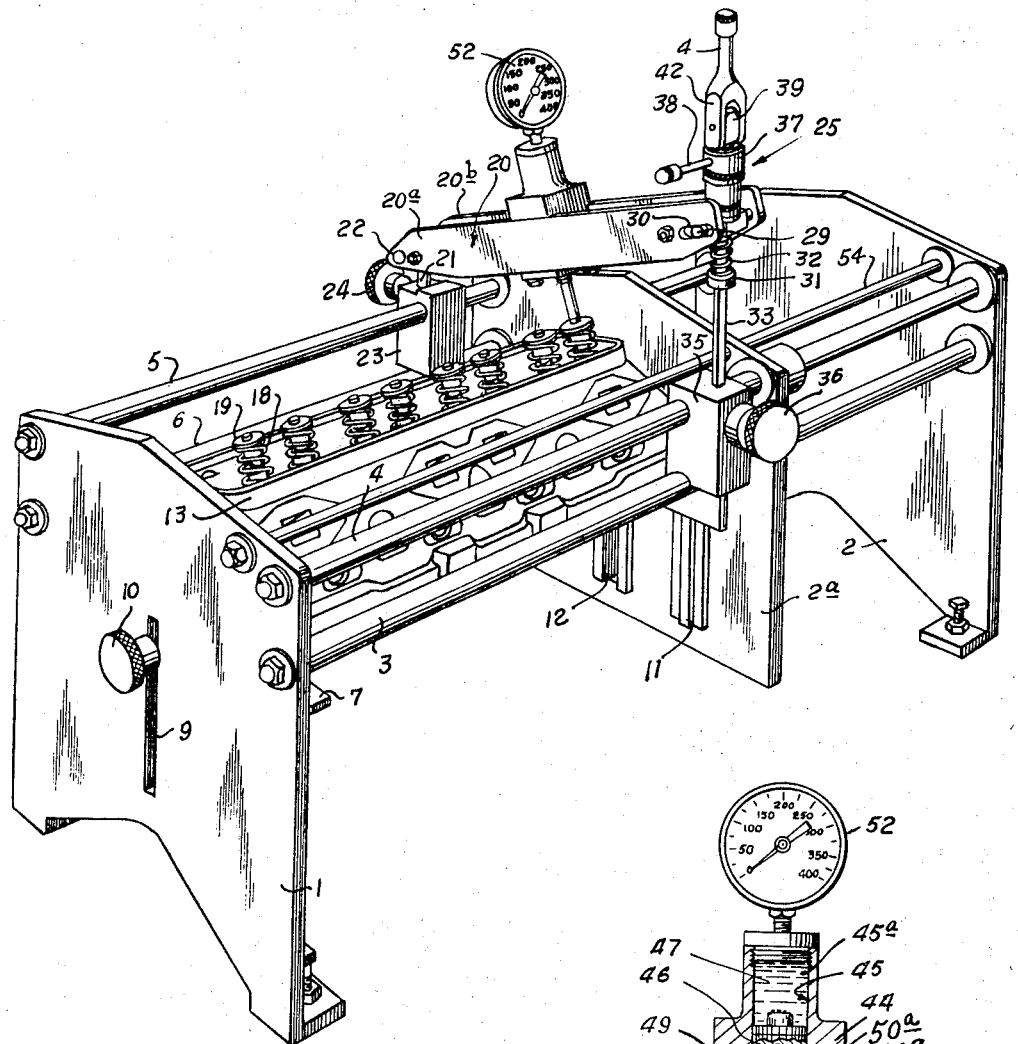
Fig. I
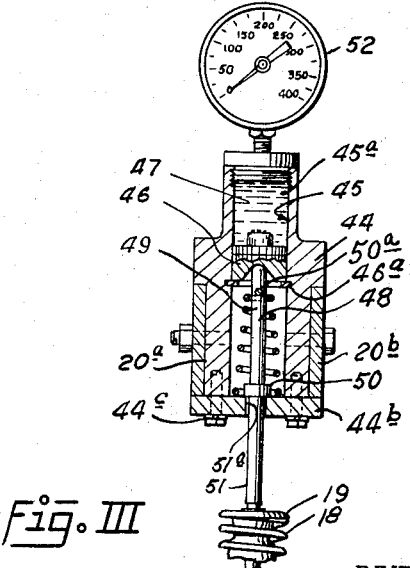
Fig. III
INVENTOR
James H. Lambert
BY Howard E. Moore
ATTORNEY

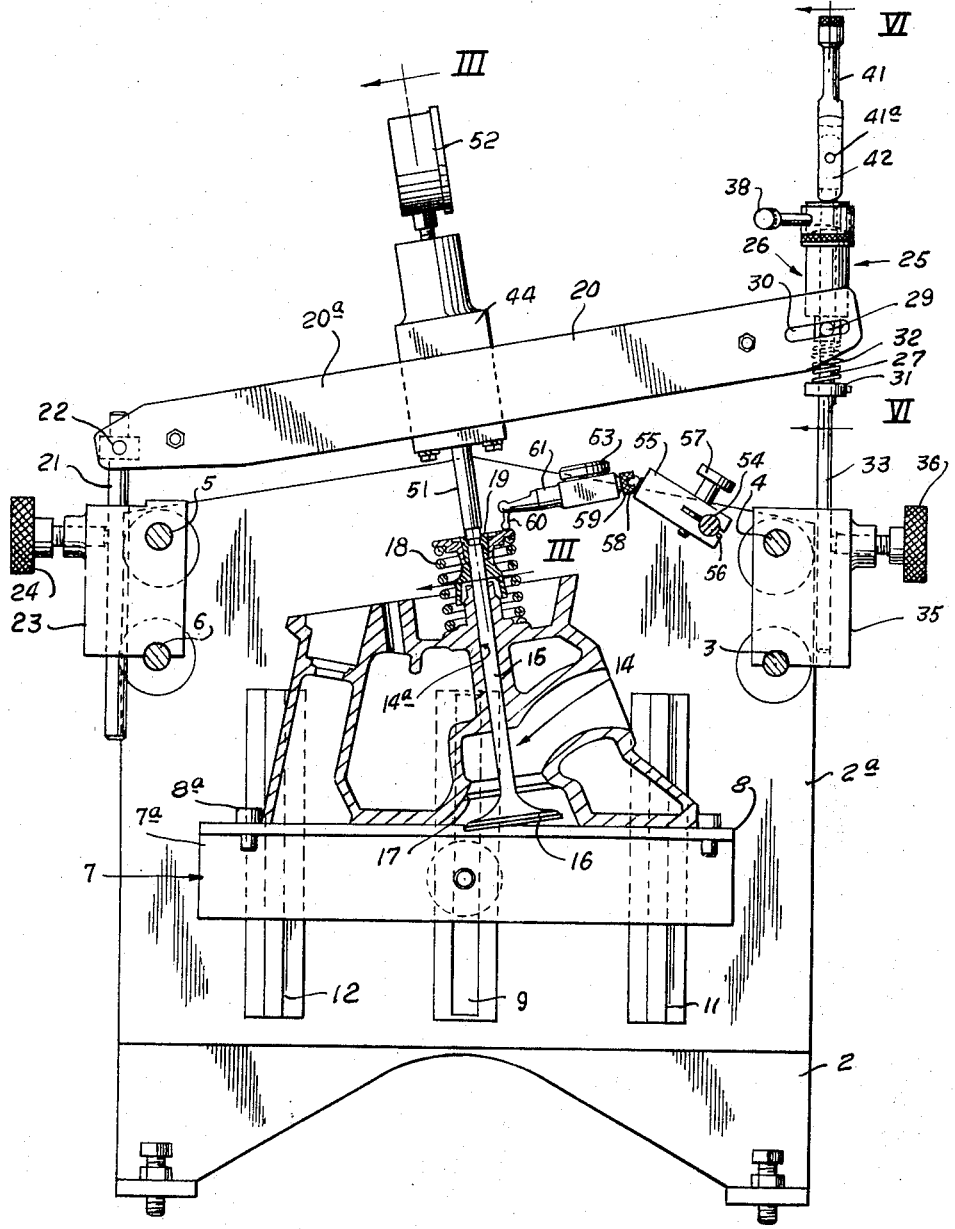
Fig. II

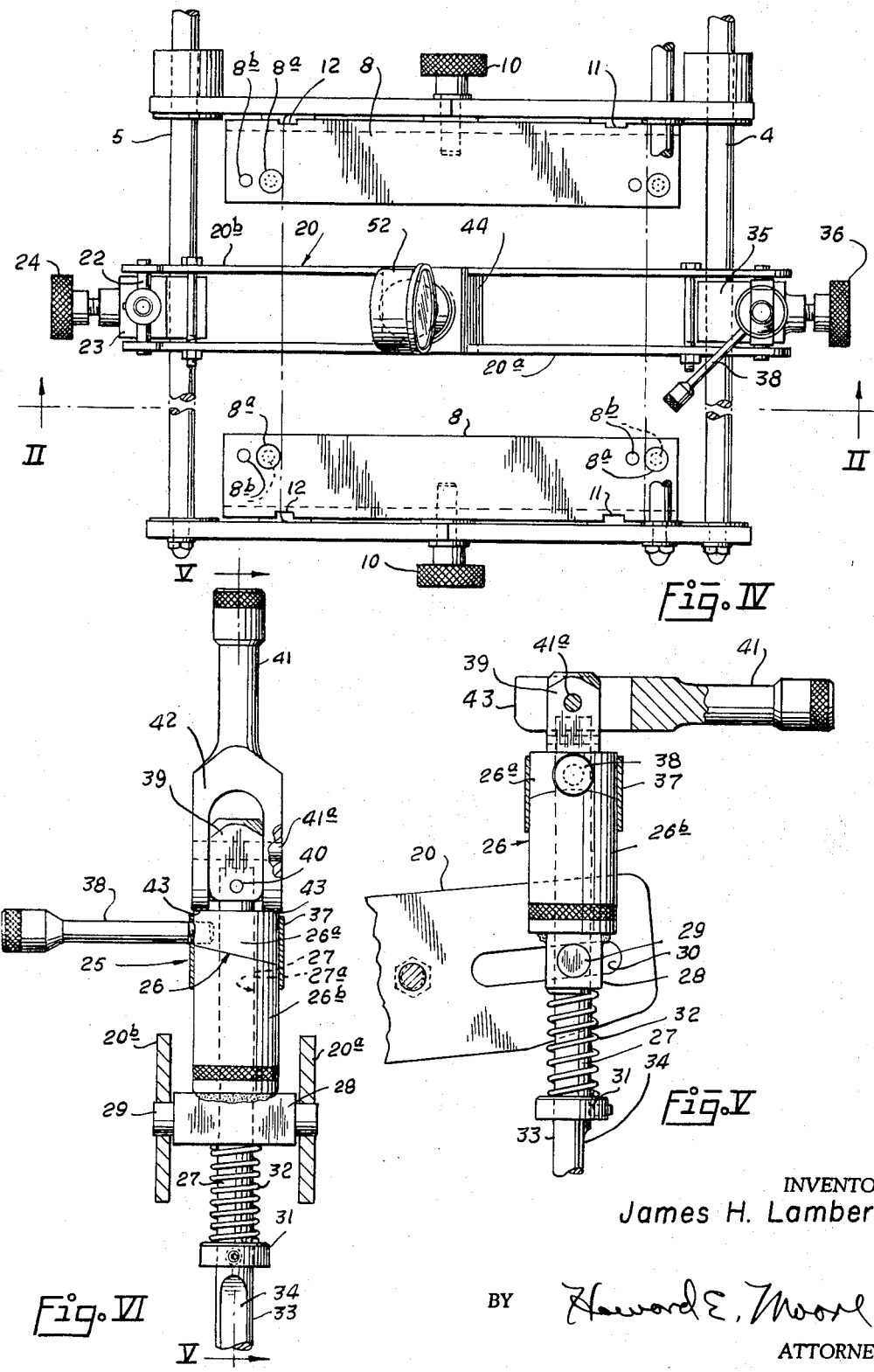

United States Patent Office 3,354,556
Patented Nov. 28, 1967

3,354,556
DEVICE FOR CHECKING SEAT LOADING SPRING PRESSURE OF VALVES IN INTERNAL COMBUSTION ENGINES
James H. Lambert, Dallas, Tex., assignor, by direct and mesne assignments, to Peterson Machine Tool, Inc., Merriam, Kans., a corporation of Missouri
Filed June 24, 1965, Ser. No. 466,571
2 Claims. (Cl. 73—118)

This invention is concerned with a device for testing the spring loading of valves in internal combustion engines after the cylinder head has been assembled, and is particularly concerned with such a device which is easy to adjust and operate, and which gives an accurate indication of the spring loading of valves after being assembled in place.

Valves in internal combustion engines are customarily spring loaded in closed position and are opened in sequence by the valve lifters, which are actuated by the cam shaft.

It is important that the valves be uniformly spring loaded and that they open at substantially the same force exerted through the valve lifters in order to secure uniform combustion and smooth running of the engine.

The present invention is intended to provide a testing device for testing the spring loading of the valves and to give an accurate indication of the exact force required to open the valve so that springs may be employed having uniform pressure, and so that adjustments may be made whereby the valves will open and close at substantially the same pressures.

The device constituting the subject matter of this invention is intended to provide such a valve spring loading testing apparatus which may be employed to test the spring loading of the valves after the cylinder head has been assembled with the valves therein.

The device is easily and quickly adjustable, and positionable over the valve stems, and the testing operation is simple, and quickly and easily carried out by the use of this device.

Other and further objects of the invention will become apparent upon reading the detailed specification hereinafter following and by referring to the drawings annexed hereto.

A suitable embodiment of the invention is shown in the attached drawings wherein, FIGURE I is a perspective view of the testing device with a cylinder head mounted therein in position to test the spring loading of one of the valves in the cylinder head;

FIGURE II is a cross-sectional elevational view taken along the line II—II of FIGURE IV;

FIGURE III is a cross-sectional elevational view taken along te line III—III of FIGURE II;

FGURE V is a fragmentary top plan view of the testing device;

FIGURE V is a fragmentary partially sectionalized elevational view of the pressure actuating mechanism; and FIGURE VI is a partially sectionalized elevational view of the pressure actuating mechanism taken at right angle to FIGURE V.

Numeral references are employed to indicate the various parts shown in the drawings and like numerals indicate like parts throughout the various figures of the drawings.

The frame for the testing device comprises end supports 1 and 2, which are held together by tie rods 3, 4, 5, and 6.

Intermediate partition member 2a is slidably adjustable on the tie rods 3–6 for the purposes hereinafter mentioned.

Angle end supports 7 are adjustably attached to the inner sides of the end frame 1 and partition 2a, so that the end supports 7 may be adjusted up and down.

The end supports 7 are slidable upwardly and downwardly on the guide rails 11 and 12 and may be secured in adjusted position by means of set screws 10 which slide in the slots 9 provided in the end plate 1 and partition 2a. The set screws 10 are threadedly engaged through the downwardly turned flange 7a of the end supports 7 so that by threading the set screws 10 inwardly, the flanges 7a may be drawn tightly against the guide rails 11 and 12 to fix the end supports 7 in adjusted vertical position.

The end supports 7 have outwardly extending flanges 8 thereon, which are arranged to support the cylinder head 13 therebetween. Pins 8a are insertable in selected holes 8b in plate 8 to limit head 13 against sidewise movement.

The cylinder head has valves 14 slidably extending through passages 14a in the wall thereof, each such valve having a stem 15 extending outwardly of the cylinder head and terminated by a spring retainer head 19. A spring 18 is disposed about the stem 15 between the plate 19 and the upper wall of the cylinder head 13, said spring being arranged to urge the valve head 16 against the seat 17.

A pivoted arm 20, which consists of spaced plate members 20a and 20b, is pivotally attached by a pivot pin 22 to an adjustment rod 21 which slidably extends through a bore provided through the adjustment block 23. The rod 21 may be secured in vertical adjusted relationship in the bore by threading a set screw 24 inwardly thereagainst.

The adjustment block 23 is slidably mounted on the tie rods 5 and 6 so that the block 23 may be slid along the tie rods 5 and 6.

A pressure actuating member, generally indicated at 25, is pivotally and slidably attached between the outer ends of the side plate members 20a and 20b in a manner hereinafter described.

The pressure actuating member 25 includes a body 26 (FIGURES V and VI) which is made up of two parts 26a and 26b separated by diagonal contacting cam surfaces 26c. A pin 27 rotatably extends through a bore 27a, which extends through the body 26b and cross piece 28.

The cross piece 28 is secured, as by welding, to the body portion 26b, and has cylindrical guide ears 29 extending outwardly therefrom, which are slidable in the elongated aligned slots 30 provided in the outer ends of the side plate members 20a and 20b A spring stop 31 is secured to the shaft 27 and the spring 32 is positioned between the spring stop 31 and the cross piece 28, said spring being arranged to urge the cross piece 28 and body members 26b and 26a upwardly on the rod 27.

The rod 27 extends below the spring stop 31 to provide a guide shaft 33, which slidably extends through a bore through the adjustment block 35 and is held against rotation therein by a flat guide surface 34 thereon which mates against a corresponding flat guide surface provided in the bore through the adjustment block 35. The rod 36 is held in adjusted vertical position by a set screw 36 threadedly extending through the wall of adjustment block 35.

The adjustment block 35 is slidable laterally on the tie rods 3 and 4.

A sleeve 37 extends about, and is secured to, the body portion 26a by a handle 38, which has an outer end extending through the wall of the sleeve 37 and threadedly engaged with the body portion 26a An attachment block 39 is secured to the upper end of the pin 27 by a rivet 40.

The handle 41 has a bifurcated end 42 thereon which straddles the attachment block 39 and is pivotally attached thereto by a pivot pin 41a. The sides of the bifurcated end 42 have cam surfaces 43 on the lower ends thereof which are arranged to cam against the upper surface of the body portion 26a to exert downward pressure on said body portion when the handle 41 is turned to upright position, as shown in FIGURE VI.

A pressure guage housing 44 is slidably secured between the side members 20a and 20b of the pivoted frame 20.

The pressure gauge housing 44 has a bore 45 therein closed at its lower end by a plate 44b, which is held in place by screws 44c.

A piston 46 is slidably disposed in the bore 45, which provides a fluid reservoir 45a thereabove in which is disposed hydraulic fluid 47. The downward movement of the piston 46 is limited by a plate 46a having an opening therethrough, through which the stem 48 may extend and engage the lower surface of the piston 46.

The rod 48 has a shoulder 50 mounted thereon, which contacts plate 44b to limit outward movement of stem 48. The spring 49 is mounted between the plate 44b and a spring stop 50a attached to rod 49. Said spring is arranged to urge the engaging pin 51 inwardly through the bore 51a provided through the cover plate 44b.

A pressure gauge 52 is mounted on the upper end of the housing 44 and is arranged to communicate with the reservoir 45a so that the pressure exerted on the fluid 47 will be transferred to the pressure gauge 52, and such pressure will be registered thereon.

The operation and function of the device hereinbefore described is as follows:

The cylinder head 13 is placed on the support flanges 8. The blocks 23 and 35 are slid along the tie rods 3, 4, 5, and 6 until the pin 51 is in position over one of the valves to be tested, with said pin centered over the valve plate 19 thereof. The pressure gauge housing 44 may be slid between the plates 20a and 20b to center the pin 51 over the valve plate 19.

The pins 21 and 33 are slidable through blocks 23 and 35 in making this adjustment.

The set screws 24 and 35 may then be tightened to set the device in adjusted position. The support member 20 may pivot about the pivot pin 22 in making this adjustment and the rod 33 is slidable through the block 35 as the frame member 20 is moved downward to bring the pin 51 into contact with the plate 19. Such downward movement may be accomplished by forward movement of the handle 41 to cause the came surfaces 43 to slide the pin 27 downwardly through the bore 26a by engagement of the cam surface 43 with the upper surface of the body member 26a.

After the pin 51 has been brought into contact with the plate 19, the handle 38 may be rotated to cause the camming surfaces 26 to co-act to thereby move the body portion 26b downwardly against the spring 32, thereby exerting an upward pressure on the pin 51 and the piston 46, which is registered on the gauge 52 through the hydraulic fluid 47.

When the downward pressure becomes sufficient to overcome the upwardly acting force of valve spring 18, the pressure can be observed on the dial of the gauge 52 to thereby exactly determine the pressure at which the valve loading spring 18 is overcome and the valve head 16 is moved away from the seat 17. Thereby the strength of the spring 18 can be accurately determined, and by comparing same with an appropriate chart, it can be determined whether or not the spring is still serviceable or needs replacing.

Such testing has been done while the valves are mounted in the cylinder head 13 under actual operating conditions.

The time at which the spring 18 is overcome to move valvehead 16 away from seat 17 may be determined by placing the finger on the plate 19 while pressure is applied thereto, or visually by indicator meter 53 of conventional construction. The meter 53 may be slidably mounted on a rod 54 extending between end frames 1 and 2. An adjustable mounting block 55 has a slotted passage 56 therethrough which may be fixed in adjusted position by a set screw 57. The indicator meter is attached to block 55 by an adjustable swivel joint 58 which may be fixed against rotation by a threaded nut 59 which may be rotated downwardly thereagainst.

A prod 60 is carried by the outer end of indicator 53, said prod being arranged, through linkage extending through housing 61, to register pressure exerted on the prod on the indicator 53.

The indicator assembly is adjusted so that prod 60 exerts a slight pressure against plate 19 of the valve being checked. Such pressure will register on the indicator 53 by a hand (not shown) thereon.

At the moment that spring 18 is overcome the pressure will be relieved from prod 60 and the dial indication or indicator 53 will disappear, at which time the pressure reading on gauge 52 can be read.

Indicator 53 is a conventional commercially available device, being commonly known as a "Last Word Indicator," and it is not thought necessary to illustrate the mechanism thereof in detail.

The use thereof is optional in the device herein described.

It will be understood that other and further embodiments of my invention may be devised without departing from the spirit and scope of the appended claims.

Having described my invention I claim:

1. In a device for testing the spring loading of valves while installed in an engine head; a general frame; means for supporting an engine head in the frame, said engine head having a plurality of spring loaded valves slidably disposed through the wall thereof; a test frame pivotally attached at one side of the frame; a hydraulically actuated pressure gauge supported by the test frame and including a chamber therein, a piston slidable in the chamber, hydraulic fluid above the piston, and a rod movable outwardly of the chamber by the fluid presure against the piston, said rod being engageable with the selected valve to move it downwardly against the spring loading thereof; means to move the test frame downwardly to bring the rod into contact with the upper end of a selected valve; and additional means to apply downward force to the rod against the valve to overcome the spring loading and apply pressure to the hydraulic fluid through the piston to register the pressure on the guage, said force applying means comprising a vertically extending rod carried by said general frame and extending upwardly adjacent the outer end of said test frame, a cam body slidable on said rod and pivotally connected to the outer end of said test frame, whereby movement of said cam body on said rod is transmitted to said test frame, spring means carried by the rod to urge said cam body upwardly thereon, and a camming member rotatable about the rod to move the cam body downwardly on the rod.

2. In a device for testing the spring loading of valves while installed in an engine head; a general frame; means for supporting an engine head in the frame, said engine head having a plurality of spring loaded valves slidably disposed through the wall thereof; a test frame pivotally attached at one side of the frame; a hydraulically actuated presure gauge support by the test frame and including a chamber therein, a piston slidable in the chamber, hydraulic fluid above the piston, and a rod movable outwardly of the chamber by the fluid pressure against the piston, said rod being engageable with the selected valve to move it downwardly against the spring loading thereof; means to move the test frame downwardly to bring the rod into contact with the upper end of a selected valve, said means comprising a cam member pivotally attached to the test frame and to the general frame, and a throw arm pivotally attached to the cam member and having a cam surface on the lower end thereof arranged to co-act with the cam member when pivoted with relation thereto to move the same downwardly; and additional means to apply downward force to the rod against the valve to overcome the spring loading and apply pressure to the hydraulic fluid through the piston to register the pressure on the gauge.

References Cited
UNITED STATES PATENTS

| | | | |
|---|---|---|---|
| 2,170,197 | 8/1939 | Gumprich | 73—161 |
| 2,340,277 | 1/1944 | Sturtevant | 73—161 |
| 2,920,482 | 1/1960 | Droke | 73—161 |
| 3,129,584 | 4/1964 | Canning et al. | 73—141 |

RICHAR C. QUEISSER, *Primary Examiner.*

JAMES. J. GILL, *Examiner.*

JERRY MYRACLE, *Assistant Examiner.*